United States Patent
Yamauchi et al.

(10) Patent No.: US 6,328,384 B1
(45) Date of Patent: Dec. 11, 2001

(54) COUPLING STRUCTURE BETWEEN SEATBACK AND ARMREST FOR VEHICLE

(75) Inventors: Yoshihiko Yamauchi; Nobuya Sato, both of Kanagawa-ken (JP)

(73) Assignee: Ikeda Bussan Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/316,085

(22) Filed: May 21, 1999

(30) Foreign Application Priority Data

May 25, 1998 (JP) .................................................. 10-143451
May 25, 1998 (JP) .................................................. 10-143454

(51) Int. Cl.[7] .................................................. A47C 7/54
(52) U.S. Cl. .............................. 297/411.29; 297/411.32; 297/411.38
(58) Field of Search .................... 297/411.29, 411.32, 297/411.38

(56) References Cited

U.S. PATENT DOCUMENTS

| 4,205,879 | 6/1980 | Heling . |
| 4,270,798 | 6/1981 | Harder, Jr. . |
| 4,400,033 | 8/1983 | Pietsch . |
| 4,848,840 | * 7/1989 | Toya ............................ 297/411.32 X |
| 5,658,043 | 8/1997 | Davidson . |
| 5,752,739 | * 5/1998 | Saeki ........................... 297/411.32 X |

* cited by examiner

Primary Examiner—Anthony D. Barfield
(74) Attorney, Agent, or Firm—Nath & Associates PLLC; Gary M. Nath; Marvin C. Berkowitz

(57) ABSTRACT

A structure where an armrest is detachably coupled to a seatback includes an axial pin, a moving pin, a supporting bracket, and a slope. The axial pin and the moving pin projects from a side face of one end of the armrest. The moving pin has a head at its distal end. The supporting bracket is fixed on a side portion of the seatback, and it has an axial hole for receiving the axial pin and a guide groove for receiving the moving pin. The axial pin is inserted into the axial hole to be rotatably supported by the supporting bracket. The moving pin is inserted into the guide groove to be moved within the guide groove according to rotation of the axial pin. The slop is disposed on an edge of the guide groove near the using point. As the armrest reaches the using position, the head rides on the slope according to movement of the moving pin, so that the moving pin approaches to the seatback. Thereby, the slope causes the armrest at the using position and the side portion of the seatback to contact with each other and the armrest is supported on the side portion of the seatback.

16 Claims, 13 Drawing Sheets

COUPLING STRUCTURE BETWEEN SEATBACK AND ARMREST FOR VEHICLE

BACKGROUND OF THE INVENTION

The present invention relates to a coupling structure between a seatback and an armrest for a vehicle.

DESCRIPTION OF THE RELATED ART

In a conventional structure where a seatback and an armrest are detachably coupled with each other, the seatback is formed at its one side portion with an axial hole and the armrest has an axial pin inserted into the axial hole. Inside the axial hole, a locking mechanism releasably engaged with the axial pin is provided. The armrest is rotatably supported in the axial hole in a state where the axial pin is prevented from coming out of the axial hole by the locking mechanism. The armrest is used in a state where it is maintained in a using position

SUMMARY OF THE INVENTION

In the above conventional structure, however, the armrest maintained at the using position tends to generate play.

Also, in a case that the armrest can not be attached to one side portion of the seatback for spatial reasons, a space is required for accommodating the armrest which has been detached.

Therefore, one object of the present invention is to provide a coupling structure capable of suppressing play of the armrest maintained at the using position. Also, another object of the invention is to provide a coupling structure where it is unnecessary to provide a space for accommodating the armrest.

In order to achieve the above objects, a first aspect of the invention relates to a coupling structure between a seatback and an armrest for a vehicle. The armrest is detachably attached to the seatback. The structure comprises an axial pin, a moving pin, a supporting bracket, and a slope. The axial pin and the moving pin project from a side face positioned at one end of the armrest. The moving pin has a head at its distal end. The supporting bracket is fixed on a side portion of the seatback and is provided with an axial hole for receiving the axial pin and a guide groove for receiving the moving pin. The axial pin is inserted into the axial hole to be rotatably supported by the supporting bracket. The moving pin is inserted into the guide groove to be moved within the guide groove according to rotation of the axial pin. When the armrest is put at the using position, the moving pin is maintained at a using point within the guide groove. The slope is disposed on an edge of the guide groove in the vicinity of the using point. When the armrest reaches the using position, the head rides on the slop according to movement of the moving pin, so that the moving pin approaches to the seatback. Thereby, the slope brings the armrest at the using position and the side portion of the seatback into contact with each other.

According to the above structure, at the using position of the armrest, the head of the moving pin rides on the slope, the moving pin approaches to the seatback, and the armrest comes into contact with the side portion of the seatback. Therefore, the armrest is supported by the side portion of the seatback, and the play is prevented from occurring in the armrest at the using position.

The moving pin may be structured with the head and a moving shaft, and the guide groove may have a head receiving hole through which the head is allowed to pass. The head projects from a distal end of the moving shaft in a radial direction thereof. The portion of the guide groove except for the head receiving hole allows movement of the moving shaft and prevents passing-through of the head. When the axial pin is inserted into the axial hole and the head passes through the head receiving hole, the armrest reaches a detaching position thereof. The movement of the moving shaft from the head receiving hole to the using point causes rotational movement of the armrest from the detaching position to the using position around the axial hole.

The guide groove may have an accommodating point between the head receiving hole and the using point, and a neck portion adjacent to the receiving point between the head receiving hole and the accommodating point. The moving shaft may include a base portion and an intermediate portion between the head and the base portion. The coupling structure may be provided with a biasing member. The intermediate portion has a diameter larger than that of the base portion. The portion of the guide groove positioned between the using point and the accommodating point allows movement of the intermediate portion. The neck portion allows movement of the base portion and prevents movement of the intermediate portion. The biasing member presses the moving pin positioned at the accommodating point in a direction opposed to the seatback.

According to the above structure, in an ordinary using state, the intermediate portion is positioned between the using point and the accommodating point, so that the moving pin is allowed to move between both the points. Also, in the accommodating point, since the moving pin is pressed in a direction opposed to the seatback by the biasing member, the intermediate portion is maintained within the guide groove so that the base portion is prevented from moving into the guide groove. Therefore, the intermediate portion and the neck portion prevent the moving pin from moving from the accommodating point to the head receiving hole. Accordingly, in the using state, the moving pin is prevented from going out of the guide groove, so that the armrest is prevented from coming out of the seatback unnecessarily.

When the armrest is detached from the seatback, the armrest is pushed towards the seatback in a state where the moving pin is put in the accommodating point. Thereby, the moving pin is moved against the biasing force of the biasing member and the base portion reaches the guide groove. In such a state, when the moving pin is pushed towards the head receiving hole, the base portion passes through the neck portion to arrive at the head receiving hole. The armrest is easily detached from the seatback by pulling the moving pin out of the head receiving hole.

When the armrest is put in its accommodating position, the moving pin is pressed by the biasing member in the direction opposed to the seatback. In such a state, as the head is supported on an edge of the guide groove, the play is prevented from occurring in the armrest in the accommodating position.

The other end of the armrest in the using position may be directed to the frontal face of the seatback. When the intermediate portion is positioned at the accommodating point, the armrest may be positioned in the accommodating position with its other end facing upwardly. The armrest positioned at the detaching position may be inclined towards the back face of the seatback rather than the accommodating position.

The biasing member may comprise a spring plate disposed between the guide groove and the seatback.

According to the above structure, the biasing member can easily be disposed in a small clearance.

The spring plate may cover the whole area of the guide groove.

According to the above structure, in the supporting bracket from which the armrest is detached, the guide groove is put in a state where it is covered with the spring plate, so that the inside of the guide groove is not exposed outwardly. Accordingly, the appearance of the seatback is improved and dust or the like is hard to accumulate in the guide groove.

The spring plate may press the head towards the guide groove in contact with the head.

The spring plate may press the moving pin positioned between the accommodating point and the using point in the direction opposed to the seatback.

A coupling structure according to a second aspect of the invention comprises first and second supporting mechanisms and a coupling mechanism. The supporting mechanisms are respectively provided at both side portions of a seatback. The coupling mechanism is provided at a side face of one end of an armrest. The coupling mechanism is selectively and detachably coupled to the supporting mechanisms.

According to the above structure, as the armrest is selectively attachable to both the side portions of the seatback, when the armrest can not be attached to one side portion of the seatback for spatial reasons, it may be attached to the other side portion. Accordingly, it is unnecessary to accommodate the armrest in a passenger compartment or a baggage room of a vehicle. Also, generation of uncomfortable noises during running of the vehicle or deformation of the armrest is prevented.

A seat including the seatback can be rotatably supported on a floor of the vehicle, and rotational movement of the seat may cause change in a frontal direction of the seatback.

According to the above structure, when the armrest attached to one side portion of the seatback interferes with a portion of a vehicle body according to rotation of the seat, the armrest may be switched and attached to the other side portion of the seatback.

The coupling mechanism may have the axial pin and the moving pin of the first aspect, and each supporting mechanism may have the supporting bracket and the slope of the first aspect.

DESCRIPTION OF THE PREFERRED EMBODIMENTS

An embodiment of the present invention will be explained with reference to the drawings below.

Figure 1:
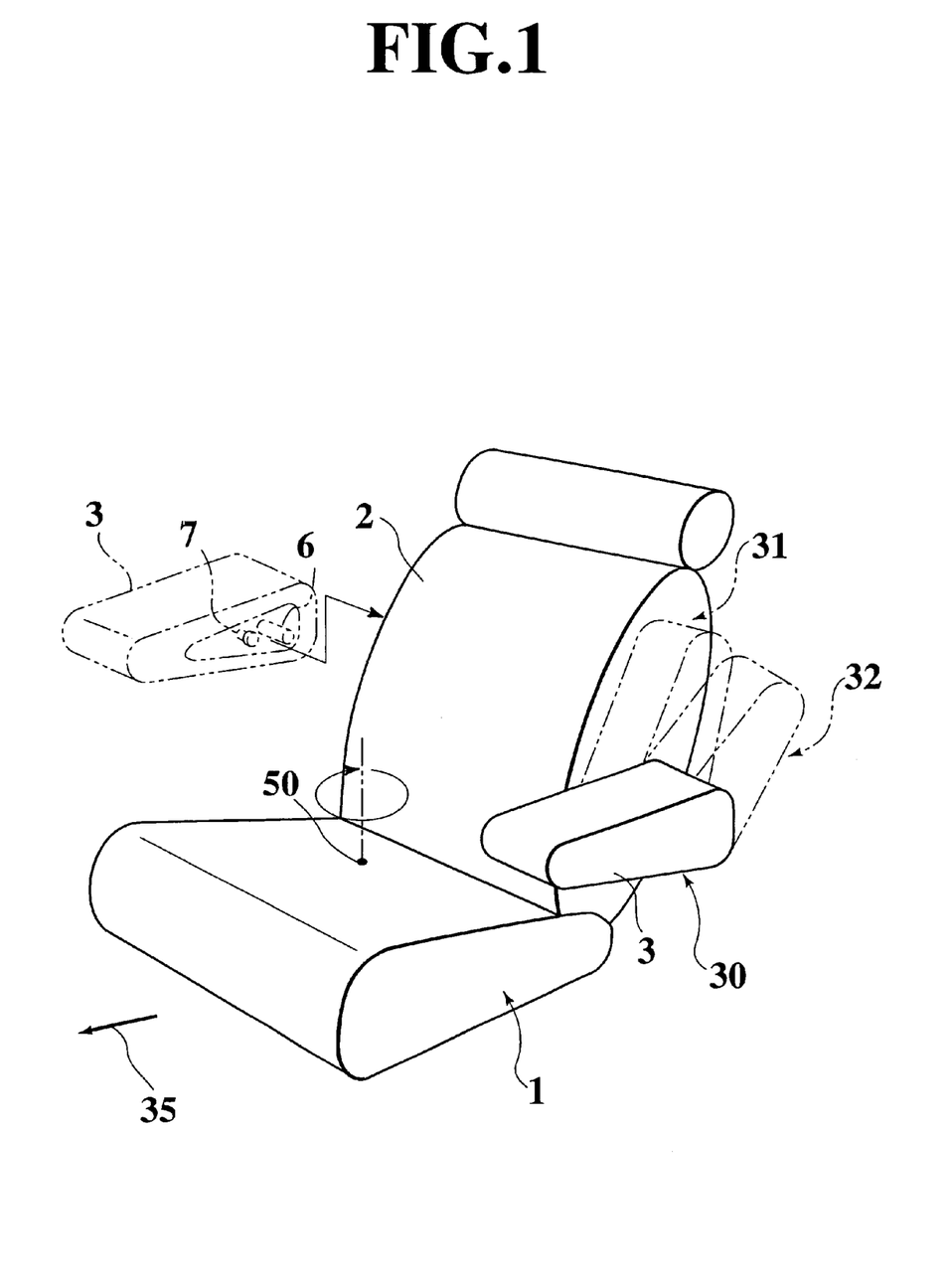
FIG. 1 is a perspective view showing a front seat according to an embodiment of the present invention.

In FIG. 1, a right side front seat 1 disposed in a wagon vehicle having a right side steering wheel is shown. An armrest 3 is rotatably or pivotably attached to a left side portion of a seatback 2. The armrest 3 is rotationally movable from a using position 30 to a detaching position 32 through an accommodating position 31.

Figure 2:
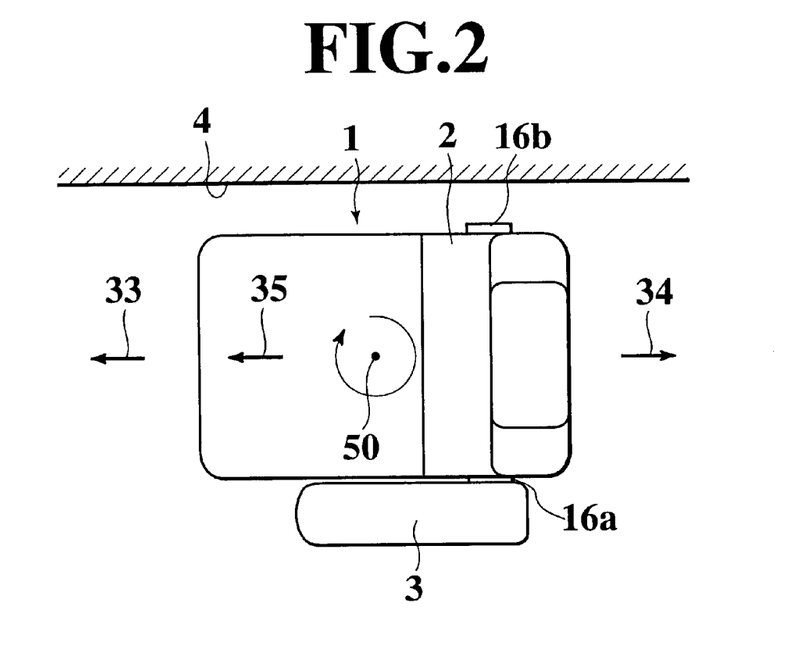
FIG. 2 is a plan view showing the front seat directed forward.
Figure 3:
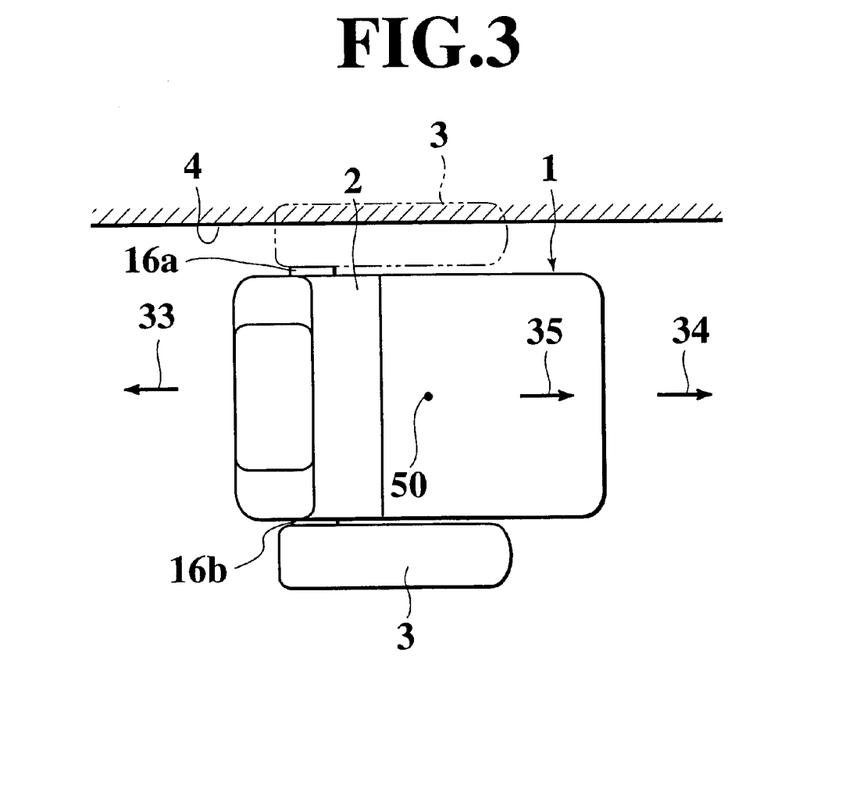
FIG. 3 is a plan view showing the front seat directed rearward.

As shown in FIG. 2, the front seat 1 at an ordinary time faces to a frontal direction 33 of the vehicle, and a front direction 35 of the seatback 2 corresponds to the frontal direction 33. As shown in FIG. 3, the front seat 1 during a stop state of the vehicle is made rotatable around a fulcrum 50 so as face in a rear direction 34 of the vehicle (the front direction of the seatback 2 corresponding to the front direction 35). When the front seat 1 is directed in the rear direction 34, the armrest 3 is detached from the left side portion and it is attached to a right side portion of the seatback 2. The detachment is effected because the armrest 3 which has been attached to the left side portion interferes with a door 4 of the vehicle during rotation of the seat 1.

Figure 4:
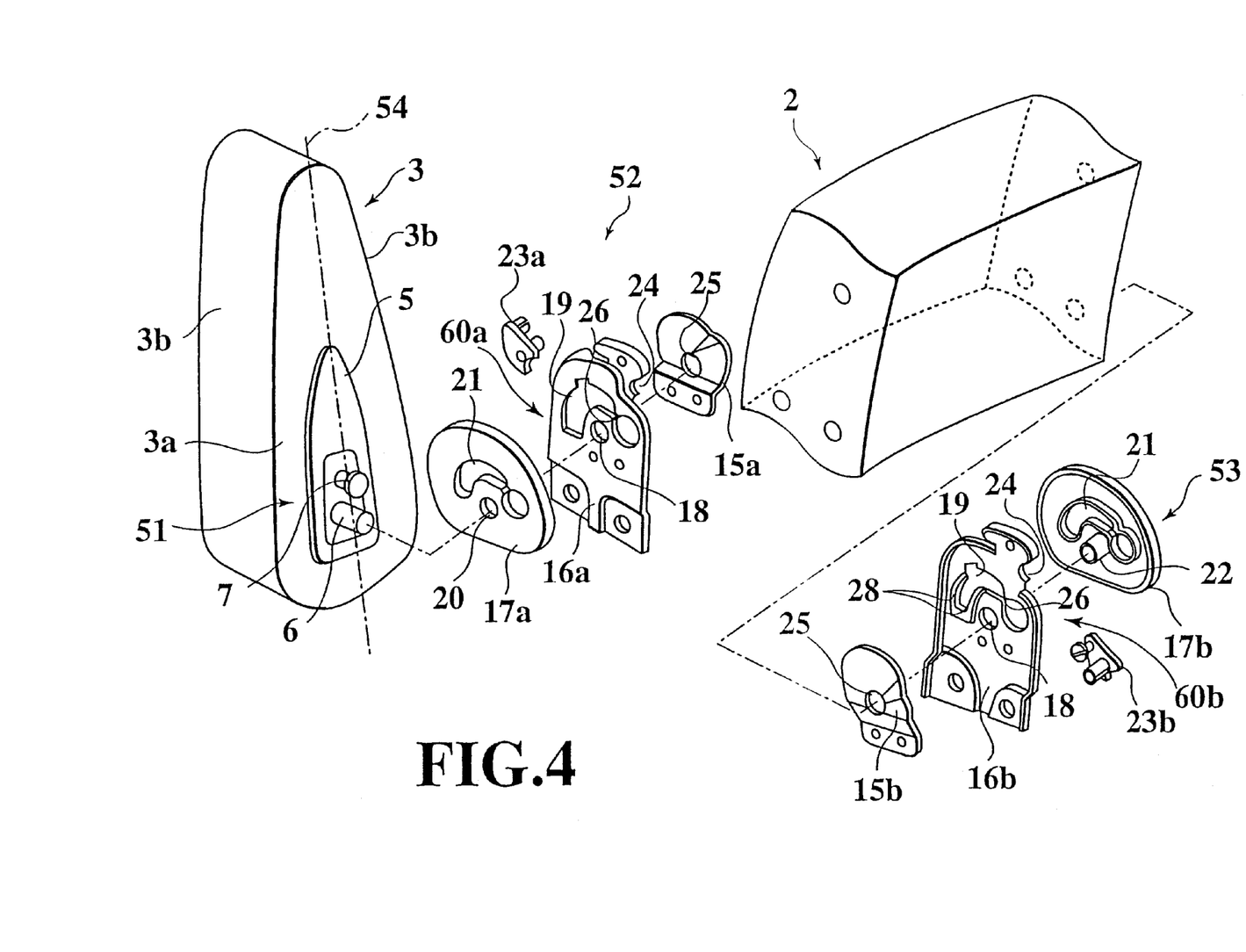
FIG. 4 is an exploded perspective view of a side structure of a seatback.

As shown in FIG. 4, such a structure that the armrest 3 is selectively attachable to the left and right side portions of the seatback 2 is established by a coupling mechanism 51 provided in the armrest 3, and first and second supporting mechanisms 52, 53 provided respectively on the left and right side portions of the seatback 2.

First, the coupling mechanism 51 on the armrest 3 will be explained with reference to FIGS. 4 to 8.

Figure 5:
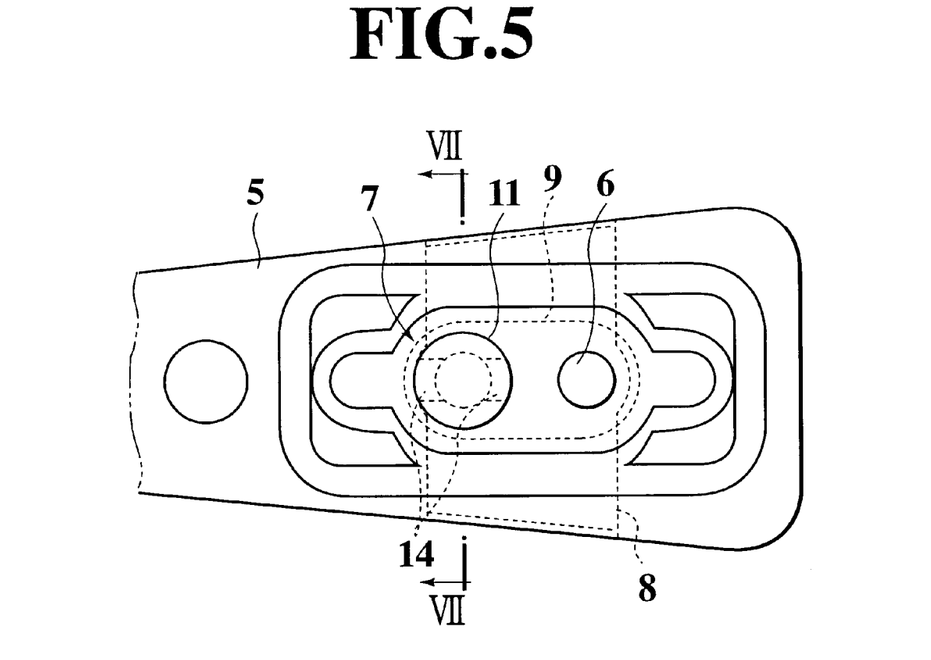
FIG. 5 is a plan view showing a structure of a side face of a base end of an armrest.
Figure 6:
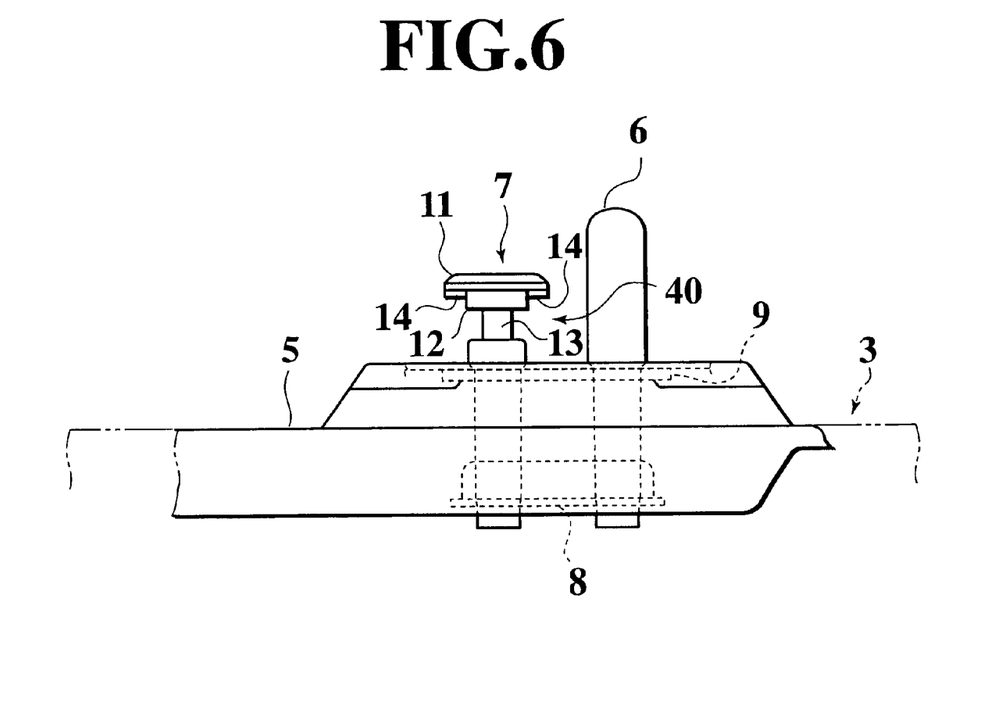
FIG. 6 is a side view showing the structure of the side face of the base end of the armrest.

A base 5 is fixed on a side face 3a of a base end of the armrest 3. An axial pin 6 and a moving pin 7 project from the base 5. The axial pin 6 has a simple cylindrical shaft configuration, and the moving pin 7 has a generally mushroom configuration. The respective proximal ends of the pins 6, 7 are supported by a bracket 8, and respective intermediate portions thereof are supported by a reinforce 9. The bracket 8 and the reinforce 9 are fixed to the base 5.

The armrest 3 has a symmetrical shape with respect to a straight line 54 (shown in FIG. 4) connecting the axial pin 6 and the moving pin 7. Faces 3b, 3b on which an arm of a passenger rests are formed on both sides of the armrest 3. When the armrest 3 is attached to the seatback 2, it is combined with a cover 10 (shown in FIG. 13).

Figure 7A:
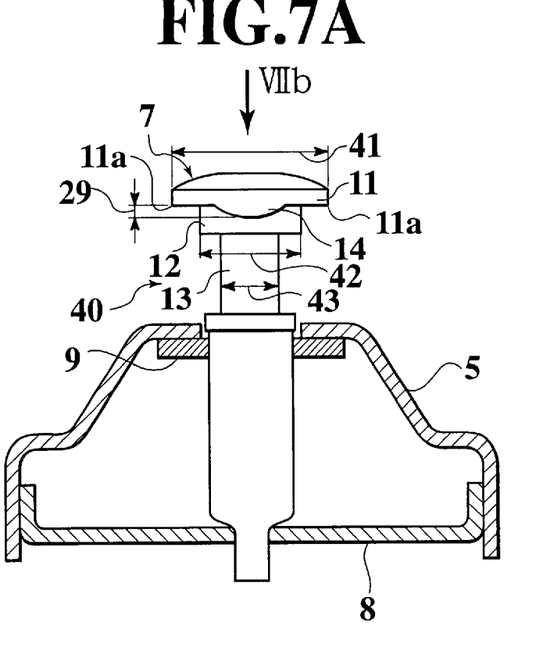
FIG. 7A is a sectional view taken along line VII—VII in FIG. 5.
Figure 7B:
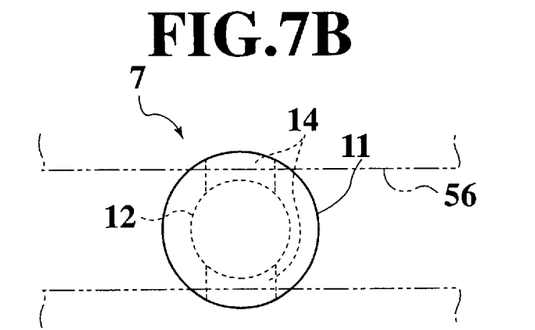
FIG. 7B is a plan view of a moving pin seen from arrow VIIb direction in FIG. 7A.
Figure 8:
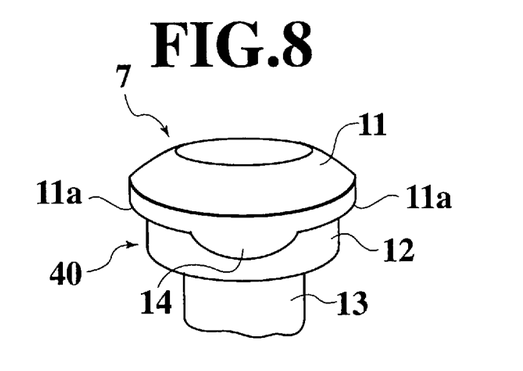
FIG. 8 is a perspective view showing the moving pin.

As shown in FIGS. 7A and 7B, the moving pin 7 comprises a moving shaft 40 extending from the base 5 and a head 11 provided at a distal end of the moving shaft 40. The moving shaft 40 comprises a base portion 13 and an intermediate portion 12 connecting the base portion 13 and the head 11. The diameter 41 of the head 11 is larger than the diameter 42 of the intermediate portion 12, and the diameter 42 of the intermediate portion 12 is larger than the diameter 43 of the base portion 13 (the diameter41>the diameter42>the diameter 43). The diameter 41 of the head 11 is larger than the width of a guide groove 56 (shown in FIG. 7B) described later, and the diameter 42 of the intermediate portion 12 is smaller than the width of the guide groove 56. A pair of projections 14 towards the guide groove 56 are formed on the back face of the head 11. A distal end of each projection 14 contacts with an edge of the guide groove 56. A clearance 29 corresponding to the height of the projection 14 is secured between the edge of the guide groove 56 and an outer edge 11a of the head 11.

Next, the first and second supporting mechanisms 52 and 53 on the left and right side portions of the seatback 2 will be explained with reference to FIG. 4.

As shown in FIG. 4, the first and second supporting mechanisms 52, 53 respectively comprise metallic spring plates 15a, 15b serving as biasing members, metallic armrest brackets 16a, 16b, and resin-made armrest finishers 17a, 17b. The armrest brackets 16a, 16b and the armrest finishers 17a, 17b respectively constitute left and right supporting brackets 60a, 60b. The left and right corresponding parts have left and right symmetrical configurations.

These elements are arranged on the side portions of the seatback 2 in the order of the spring plates 15a, 15b, the armrest brackets 16a, 16b and the armrest finishers 17a, 17b. The spring plates 15a, 15b and the armrest finishers 17a, 17b are respectively attached to the armrest brackets 16a, 16b. The lower portions of the armrest brackets 16a, 16b are respectively fixed to the side portions of the seatback 2 by bolts (not shown). Upper portions of the armrest brackets 16a, 16b are respectively engaged with resin brackets 23a, 23b fixed to the side portions of the seatback 2.

Each of the biasing members configured by the spring plates 15a, 15b is suitable for placement in a narrow space. When the armrest 2 is positioned between the using position 30 and the accommodating position 31 (shown in FIGS. 1 and 9), each of the spring plates 15a, 15b imparts a biasing force 44 (shown in FIGS. 12 and 14) on the moving pin 7 in a direction opposed to the seatback 2. As a conventional locking mechanism engaged with the axial pin 10 of the armrest 3 is not required for the seatback 2, the seatback 2 has a simple structure.

Next, the first and second supporting mechanisms 52, 53 will be explained in detail. Since the supporting mechanisms 52, 53 have almost the same structure, explanation of the second supporting mechanism 53 will be omitted and the first supporting mechanism 52 will be explained.

Figure 9:
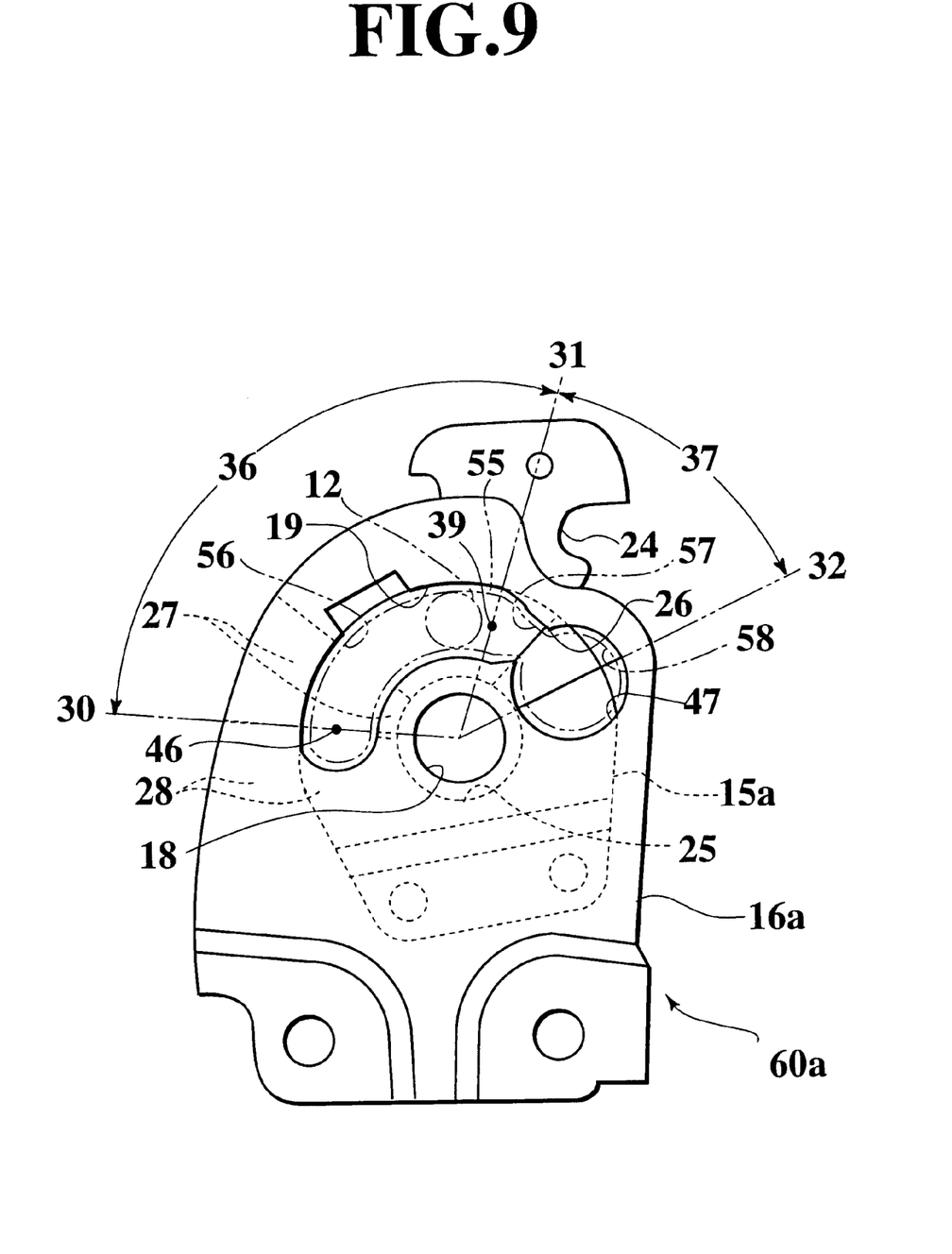
FIG. 9 is a side view showing an armrest bracket.
Figure 10:
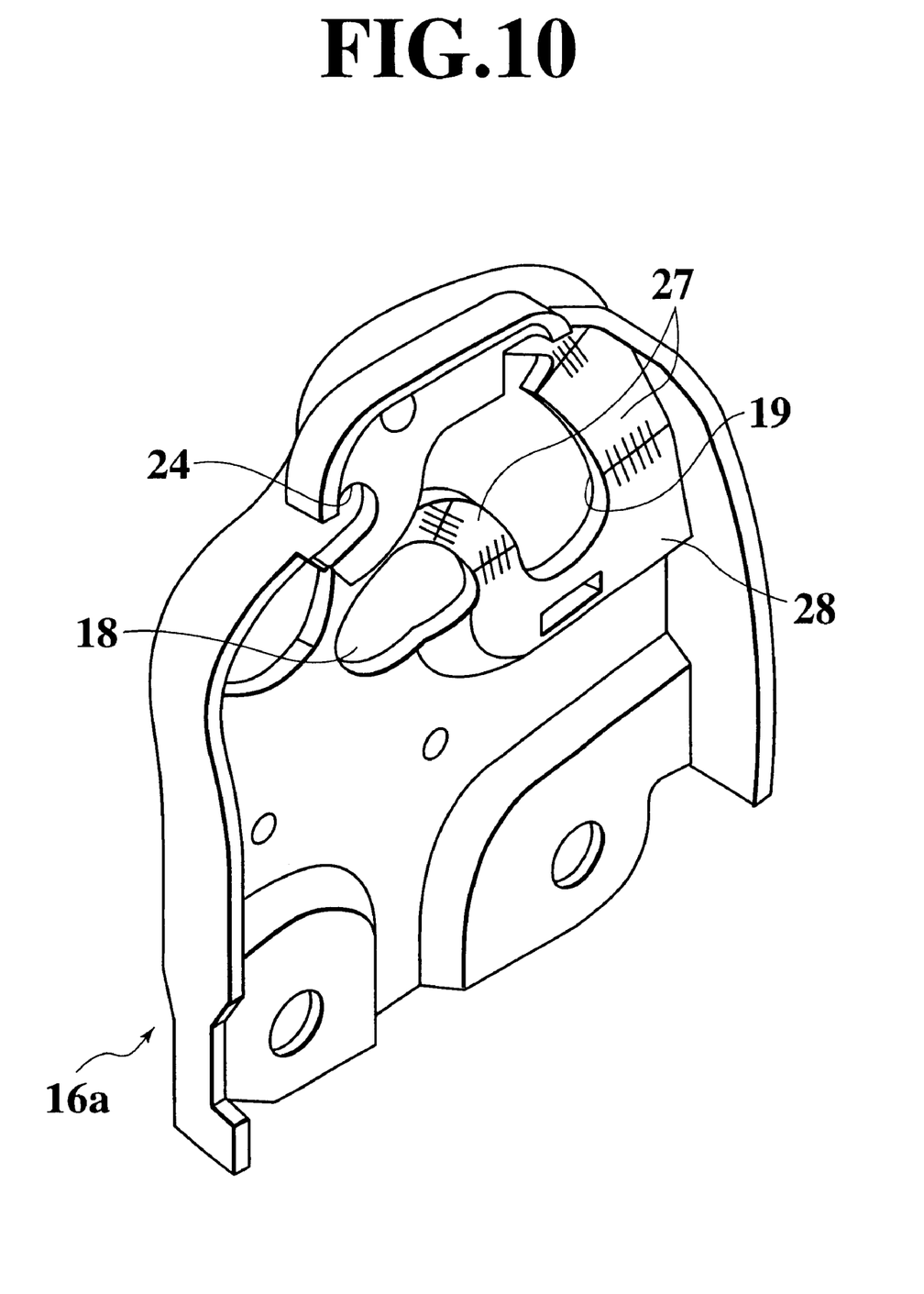
FIG. 10 is a perspective view showing a back side of the armrest bracket.

As shown in FIGS. 9 and 10, a hole 18 and a groove 19 are formed in the armrest bracket 16a. The groove 19 extends along a circular arc about the hole 18. The groove has a hole portion 47 at its one end and a neck 26 adjacent thereto. The portion of the groove 19 positioned between the other end of the groove 19 and the neck 26 has almost the same width, the width of the neck 26 is smaller than that of the other end, and the diameter of the hole portion 47 is larger than the width of the other end.

Figure 11:
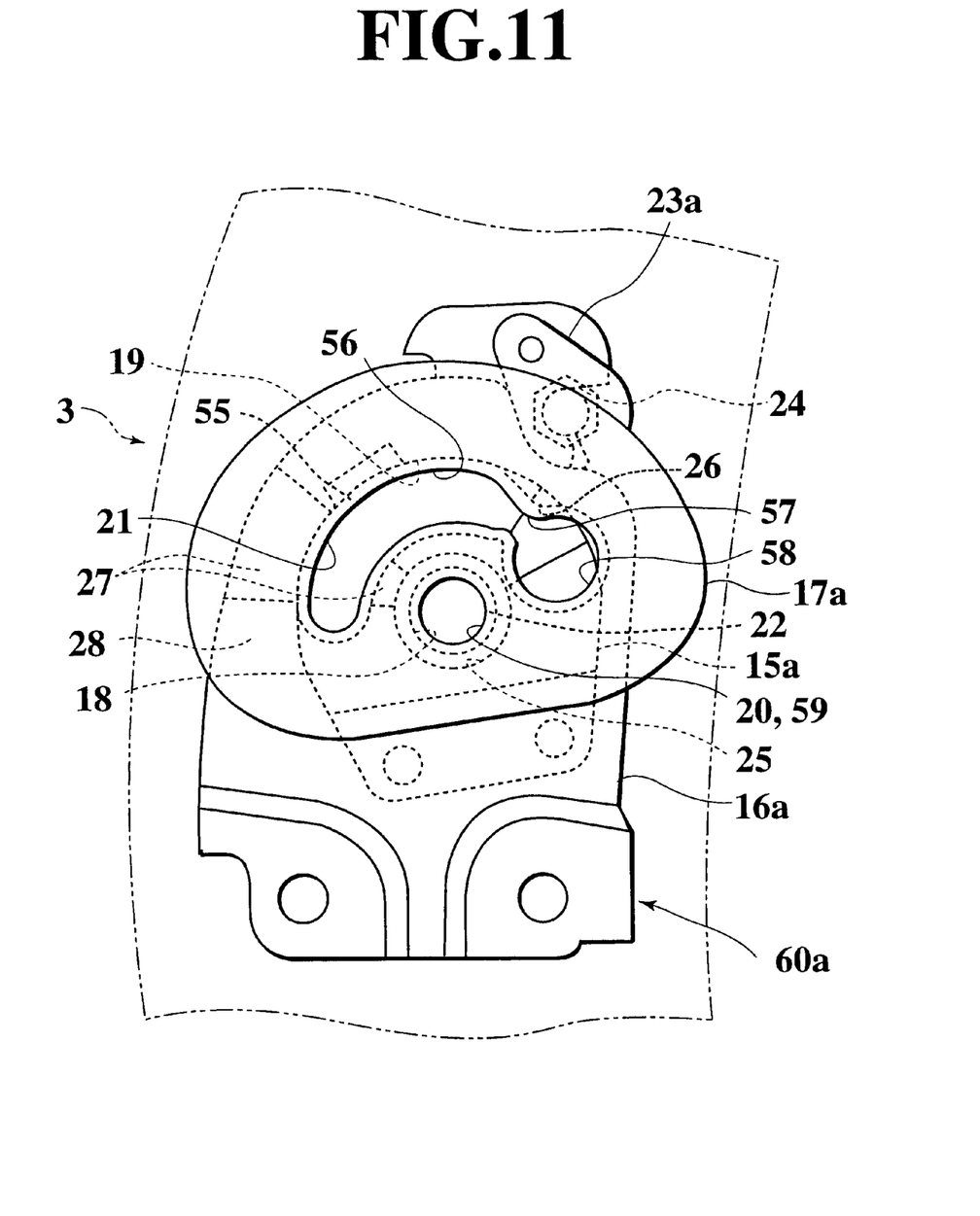
FIG. 11 is a side view showing the armrest bracket combined with an armrest finisher.
Figure 13:
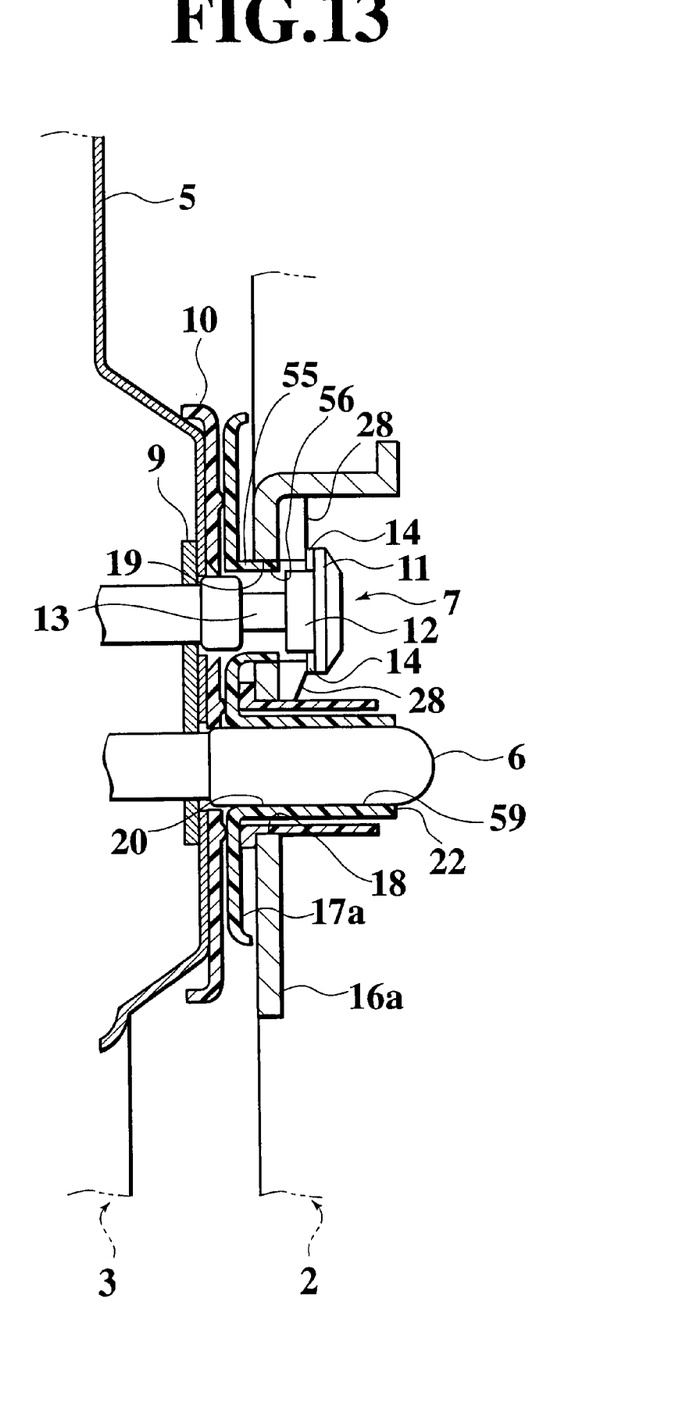
FIG.13 is a sectional view showing the armrest at a using position and the seatback.
Figure 14:
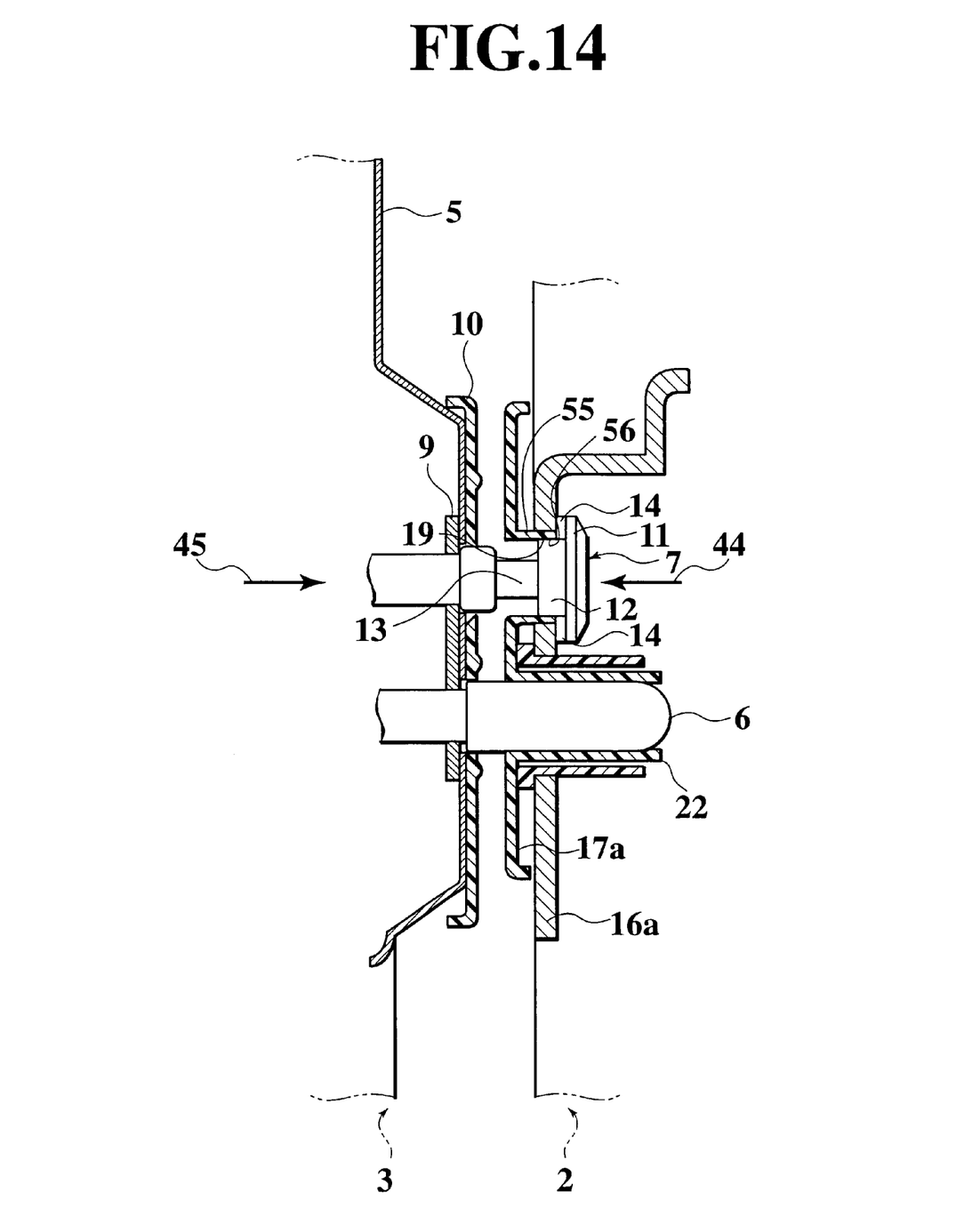
FIG. 14 is a sectional view showing the armrest at an accommodating position and the seatback.

As shown in FIG. 11, a hole 20 corresponding to the hole 18 and a cutout 21 corresponding to the groove 19 are formed in the armrest finisher 17a. As shown in FIGS. 13, 14, the armrest finisher 17a has a wall 55 bent from a peripheral portion of the cutout 21 towards the armrest bracket 18, and the wall 55 contacts with an inner face of the groove 55.

Figure 15:
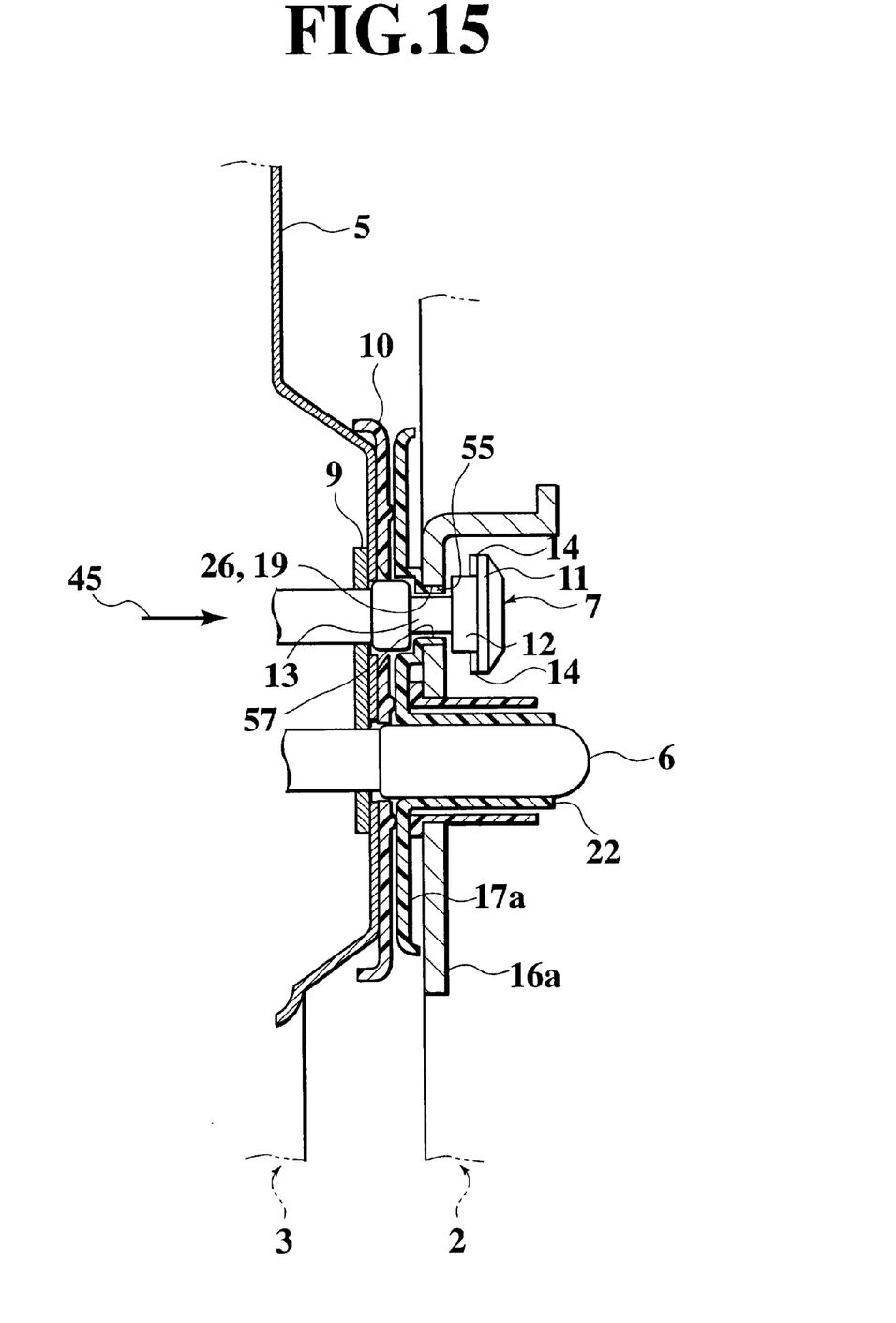
FIG. 15 is a sectional view showing an attaching portion of the armrest and the seatback at a neck portion.
Figure 16:
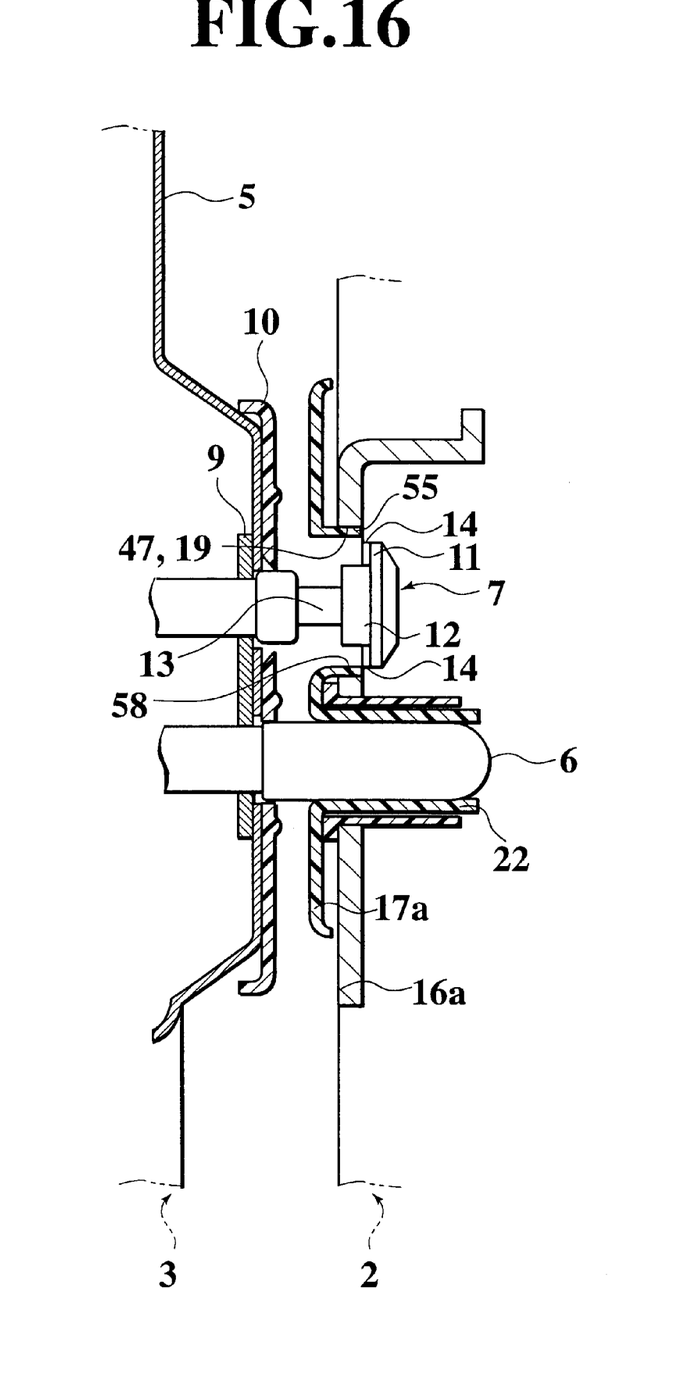
FIG. 16 is a sectional view showing the armrest and the seatback at a detaching position.

The inner face of the wall 55 defines the guide groove 56 of the supporting bracket 60a. As shown in FIG. 15, an inner face of the wall 55 corresponding to the neck 26 of the groove 19 defines a neck portion 57 of the supporting bracket 60a. As shown in FIG. 16, an inner face of the wall 55 corresponding to the hole portion 47 of the groove 19 defines a head receiving hole 58 of the supporting bracket 60a.

As shown in FIG. 9, the guide groove 56 has the head receiving hole 58 at its one end, the neck portion 57 adjacent thereto, an accommodating point 39 adjacent to the neck portion 57, and a using point 46 at the other end. The diameter of the head receiving hole 58 is larger than the diameter 41 (shown in FIG. 7A) of the head 11 and, therefore, the head receiving hole 58 allows passing-through of the head 11. The width of the portion of the guide groove 56 positioned between the using point 46 and the accommodating point 39 is smaller than the diameter 41 (shown in FIG. 7A) of the head 11 and is larger than the diameter 42 (shown in FIG. 7A) of the intermediate portion 12. Therefore, the portion of the guide groove 56 between the using point 46 and the accommodating point 39 prevents passing-through of the head 11 and allows movement of the intermediate portion 12. The minimum width of the neck portion 57 is smaller than the diameter 42 of the intermediate portion 12 (shown in FIG. 7A) and larger than the diameter 43 of the base portion 13. Therefore, the neck portion 57 allows movement of the base portion 13 and prevents movement of the intermediate portion 12.

As shown in FIG. 11, the spring plate 15a has a hole 25 corresponding to the holes 18, 20 and it covers the guide groove 56 (the groove 19 and the cutout 21).

As shown in FIGS. 11 and 13, a cylindrical portion 22 projects from a peripheral portion of the hole 20 towards the seatback 2 to be inserted into the holes 18, 25. An inner peripheral face of the cylindrical portion 22 defines an axial hole 59 for rotatably supporting the axial pin 6.

As shown in FIGS. 4 and 9, a recessed portion 24 engaged with a resin bracket 23a is formed at an upper portion of the armrest bracket 16a. As the upper portion of the armrest bracket 16a is supported by the resin bracket 23a having a low strength, the rigidity of the side portion of the seatback 2 is not increased excessively. Accordingly, when a load is imparted on the seatback 2 (shown in FIG. 2) in the rear direction 34, deformation of the resin bracket 23a allows rearward deformation of the seatback 2, so that the load acting in the rear direction 34 can securely be absorbed.

Also, since the upper portion of the armrest bracket 16a is fixed to the seatback 2 within a range of the strength of the resin bracket 23a, the rigidity of the armrest bracket 16a required for use is secured sufficiently.

As shown in FIG. 9, the intermediate portion 12 of the guide groove 56 may move within an ordinary range defined between the accommodating point 39 and the using point 46. When the intermediate portion 12 is positioned at the using point 46, the armrest 13 is positioned at the using position 30 where the other end thereof faces in the frontal direction 35. When the intermediate portion 12 is positioned at the accommodating point 39, the armrest 3 is positioned at the accommodating position 31 where the other end faces upwardly along the seatback 2. The neck portion 57 prevents the intermediate portion 12 positioned within the ordinary range 36 from moving to a detaching range 37 between the accommodating point 12 and the head receiving hole 47.

The spring plate 15a applies biasing force 44 (shown in FIG. 12) on the moving pin 7 in the direction opposed to the seatback 2 only within the ordinary range 36 while it is put in contact with the head 11. In the state where the head 11 is applied with the biasing force 44 from the spring plate 15a, the projections 14 are brought into close contact with the edges of the guide groove 56 (the edges of the groove 19 of the armrest bracket 16a).

A slope 28 rising towards the seatback 2 is formed on an edge of the groove 19 near the using point 46. The slope 28 has an inclination portion 27 gradually approaching to the seatback 2 from the accommodating point 39 along the direction to the using point 46. The inclination portion 27 and the slope 28 are formed at each of both sides of the groove 19.

Next, operation of this embodiment will be explained mainly with reference to FIGS. 13 to 16. In the following description, explanation will be made on the armrest 3 disposed at the left side portion of the seatback 2 directed forward, as show in FIG. 2.

As shown in FIGS. 13 and 14, when the axial pin 6 is inserted into the axial hole 59, and the base portion 13 or the intermediate portion 12 of the moving pin 7 is positioned in the guide groove 56, the moving pin 7 is movable within the ordinary range 36 between the using point 30 and the accommodating point 31, and the armrest 3 is rotationally movable between the using position 30 and the accommodating position 31 about the axial hole 59. In the ordinary range 36, since the diameter of the head 11 of the moving pin 7 is larger than the width of the guide groove 56, the armrest 3 is prevented from coming off.

Furthermore, as shown in FIG. 13, when the moving pin 7 moves to the using point 46 (the armrest 3 is moved to the using position 30), the head 11 (the projections 14) rides on the slope 28 along the inclination portion 27 and the moving pin 7 moves towards the seatback 2. Therefore, the armrest 3 contacts with the side portion (the armrest finisher 17a) of the seatback 2. Accordingly, in the using position 30, the armrest 3 is supported by the side portion of the seatback 2, so that play of the armrest 3 is prevented from occurring along the transverse direction of the vehicle (the width direction of the seatback 2).

When the armrest 3 is not used, the armrest 3 is first rotated upward to be moved up the accommodating position 31. When the armrest 3 is moved to the accommodating position 31, the moving pin 7 slides down on the slope 28 along the inclination portion 27.

Figure 12:
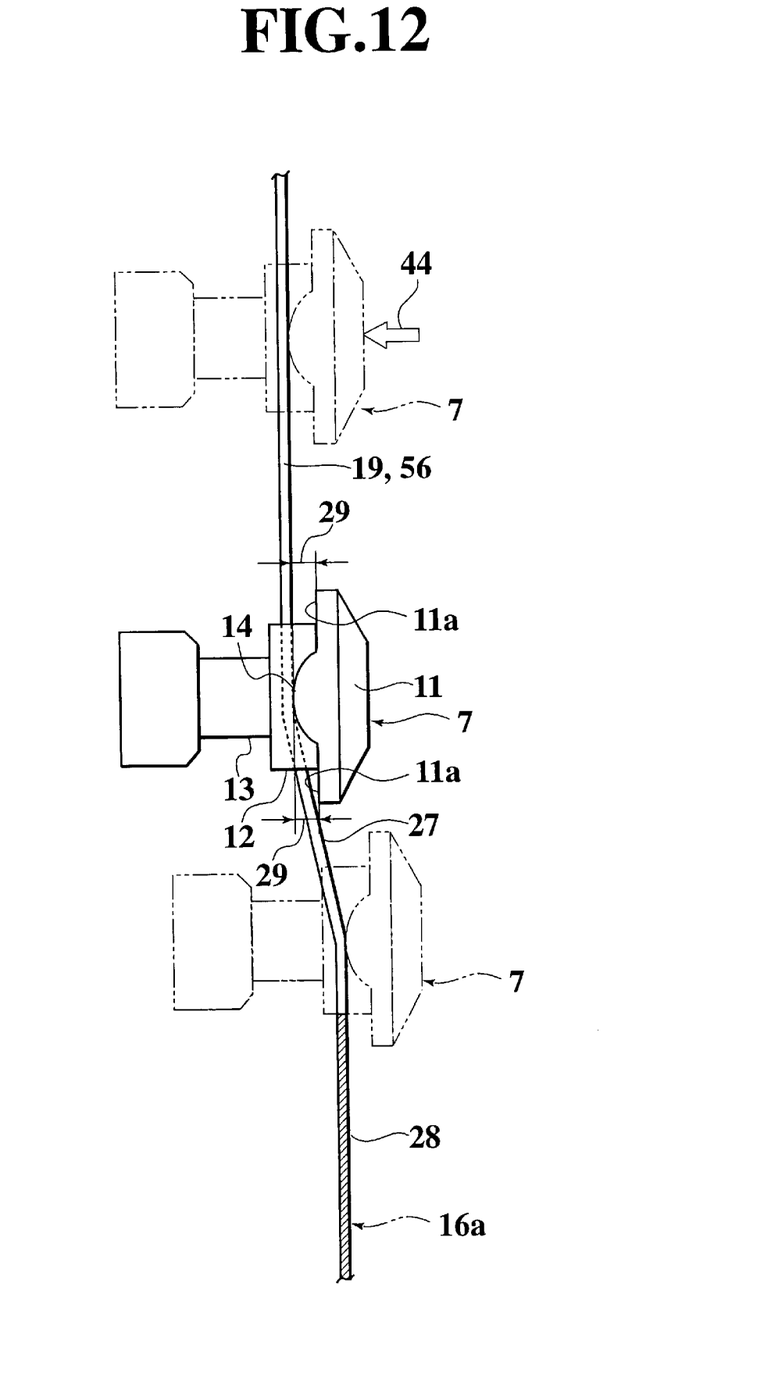
FIG. 12 is a diagram showing a moving locus of the moving pin.

As shown in FIG. 12, the clearance 29 corresponding to the height of the projection 14 suppresses generation of a strong interference between the edges of the slope 28 including the inclination portion 27 and of the guide groove 56 and an outer edge 11a of the head 11 while the moving pin 7 is moving along the inclination portion 27. Therefore, the moving pin 7 moves smoothly. As the clearance 29 is formed so as to correspond to the outer edge 11a of each side of the head 11, the strong interference between the outer edge 11a, and the inclination portion 27 and the like is suppressed both in a case where the head slides up along the inclination portion 27 and in a case where it slides down there along. Accordingly, the armrest 3 is rotationally operated smoothly.

As shown in FIG. 14, the moving pin 7 which has reached the accommodating point 39 (shown in FIG. 9) is subjected to the biasing force 44 by the spring plate 15a. As a result, the play of the armrest 2 positioned at the accommodating position 31 is also prevented from occurring in the transverse direction of the vehicle. When the moving pin 7 at the accommodating point 39 is pressed towards the seatback 2 with a force exceeding the biasing force 44 of the spring plate 15a the armrest 3 approaches to the seatback 2.

When the armrest 3 is detached from the seatback 2, the armrest 3 at the accommodating point 39 which is an entrance of the neck portion 26 is pressed towards the seatback 2 with a force exceeding the biasing force 44 and the base portion 13 is moved into the guide groove 56. In such a state, when the moving pin 7 is pressed to the detaching range 37, as shown in FIG. 15, since the base portion 13 passes through the neck portion 26, the moving pin 7 passes through the neck portion 26 to move into the head receiving hole 58 (shown in FIG. 16). Since the head receiving hole 58 allows passing-through of the head 11, the moving pin 7 within the head receiving hole 58 is pulled in a direction apart from the seatback 2, so that the moving pin 7 is pulled out of the head receiving hole 58. Thus, the armrest 3 is easily detached from the seatback 2.

After the armrest 3 is detached, the armrest finisher 17a is exposed. However, as the spring plate 15a covers the whole of the guide groove 56 (the groove 19 and the cutout 21), the inside of the guide groove 56 is not exposed. Thus, the appearance of the seatback 2 is improved and dust or the like is hard to accumulate in the guide groove 56 (the groove 19).

Since the armrest 3 can selectively be attached to the left and right side portions of the seatback 2, it is unnecessary to provide a space for accommodating the armrest 3 detached from one of the side portions in the passenger compartment of the baggage room of the vehicle. And, since the armrest 3 detached is not put in the passenger compartment or the like, uncomfortable noises generated by movement of the armrest 3 due to vibrations generated during a running situation of the vehicle can be suppressed. Furthermore, the axial pin 6 or the moving pin 7 is prevented from deforming due to the movement of the armest 3, so that rotational operationability of the armrest 3 attached to the seatback 2 does not deteriorate.

In the embodiment, the above explanation has been made on the front seat 1 which is changeable in its orientation by rotation, but the prevent invention is applicable to a seat changeable in its orientation by another method except for the rotation. Also, the present invention is not limited to the front seat 1, but it is also applicable to a second seat or a third seat.

What is claimed is:

1. A coupling structure between a seatback and an armrest for a vehicle, the armrest being detachably coupled to the seatback, the coupling structure comprising:

an axial pin and a moving pin projecting from a side face of one end of an armrest, the moving pin having a head at its distal end;

a supporting bracket fixed on a side portion of a seatback, the supporting bracket having an axial hole for receiving the axial pin and a guide groove for receiving the moving pin, the axial pin being inserted into the axial hole to be rotatably supported by the supporting bracket, the moving pin being inserted into the guide groove to be moved within the guide groove according to rotation of the axial pin, and the moving pin being maintained at a using point of the guide groove as the armrest is put in a using position; and a slope provided on the supporting bracket, for bringing the armrest at the using position and the side portion of the seatback into contact with each other, the slope being disposed at an edge of the guide groove near the using point, and the head riding on the slope according to movement of the moving pin so that the moving pin approaches to the seatback as the armrest reaches the using position.

2. A coupling structure according to claim 1, wherein
the moving pin comprises the head and a moving shaft,
the head projects from a distal end of the moving shaft towards a radial direction of the moving shaft,
the guide groove has a head receiving hole allowing passing-through of the head,
the portion of the guide groove except for the head receiving hole allows movement of the moving shaft and prevents passing-through of the head,
the armrest reaches a detaching position as the axial pin is inserted in the axial hole and the head passes through the head receiving hole, and
the movement of the moving shaft from the head receiving hole to the using point causes rotational movement of the armrest about the axial hole from the detaching position to the using position.

3. A coupling structure according to claim 2, further comprising a biasing member on the armrest, wherein
the guide groove has an accommodating point between the head receiving hole and the using point, a neck portion adjacent to the accommodating point between the head receiving hole and the accommodating point,
the moving shaft has a base portion and an intermediate portion between the head and the base portion,
the intermediate portion has a diameter larger than that of the base portion,
the portion of the guide groove positioned between the using point and the accommodating point allows movement of the intermediate portion,
the neck portion allows movement of the base portion and prevents movement of the intermediate portion, and
the biasing member presses the moving pin positioned at the accommodating point in a direction opposed to the seatback.

4. A coupling structure according to claim 3, wherein
the other end of the armrest at the using position face in a front direction of the seatback,
the armrest is positioned at an accommodating position where the other end of the armrest faces upward, as the intermediate portion is positioned at the accommodating point, and
the armrest at the detaching position is inclined in a back face of the seatback rather than the accommodating position.

5. A coupling structure according to claim 3, wherein the biasing member comprises a spring plate disposed between the guide groove and the seatback.

6. A coupling structure according to claim 5, wherein the spring plate covers the whole area of the guide groove.

7. A coupling structure according to claim 5, wherein the spring plate presses the head towards the guide groove while the spring plate contacts with the head.

8. A coupling structure according to claim 5, wherein the spring plate presses the moving pin positioned between the accommodating point and the using point in a direction opposed to seatback.

9. A coupling structure between a seatback and an armrest for a vehicle, the armrest being detachably coupled to the seatback, the coupling structure comprising;
first and second supporting mechanisms disposed on both side portions of a seatback, respectively; and
a coupling mechanism provided on a side face of one end of an armrest, the coupling mechanism being selectively and detachably coupled to the supporting mechanisms,
wherein a seat including the seatback is rotatably supported on a floor, wherein rotational movement of the seat causes change in a frontal direction of the seatback, and
wherein the coupling mechanism has an axial pin and a moving pin projecting from the side face of the one end of the armrest,
the moving pin has a head at its distal end,
each of the supporting mechanisms has a supporting bracket fixed on the side portion of the seatback and a slope fixed on the supporting bracket,
the supporting bracket has an axial hole for receiving the axial pin and guide groove for receiving the moving pin,
the axial pin is inserted into the axial hole to be rotatably supported by the supporting bracket,
the moving pin is inserted into the guide groove to be moved within the guide groove according to rotation of the axial pin,
the moving pin is maintained at a using point of the guide groove as the armrest is positioned at a using position,
the slope is disposed at an edge of the guide groove near the using point, and
as the armrest reaches the using position, the head rides on the slope according to movement of the moving pin and the moving pin approaches to the seatback, so that the slope causes the armrest at the using position and the side portion of the seatback to contact with each other.

10. A coupling structure according to claim 9, wherein
the moving pin comprises the head and a moving shaft,
the head projects from a distal end of the moving shaft towards a radial direction of the moving shaft,
the guide groove has a head receiving hole allowing passing-through of the head,
the portion of the guide groove except for the head receiving hole allows movement of the moving shaft and prevents passing-through of the head,
the armrest reaches a detaching position as the axial pin is inserted in the axial hole and the head passes through the head receiving hole, and
the movement of the moving shaft from the head receiving hole to the using point causes rotational movement of the armrest about the axial hole from the detaching position to the using position.

11. A coupling structure according to claim 10, further comprising a biasing member on the armrest, wherein
the guide groove has an accommodating point between the head receiving hole and the using point, a neck portion adjacent to the accommodating point between the head receiving hole and the accommodating point.
the moving shaft has a base portion and an intermediate portion between the head and the base portion,
the intermediate portion has a diameter larger than that of the base portion,
the portion of the guide groove positioned between the using point and the accommodating point allows movement of the intermediate portion,
the neck portion allows movement of the base portion and prevents movement of the intermediate portion, and
the biasing member presses the moving pin positioned at the accommodating point in a direction opposed to the seatback.

12. A coupling structure according to claim 11, wherein the other end of the armrest at the using position face in a frontal direction of the seatback, the armrest is positioned at an accommodating position where the other end of the armrest faces upward, as the intermediate portion is positioned at the accommodating point, and the armrest at the detaching position is inclined in a back face of the seatback rather than the accommodating position.

13. A coupling structure according to claim 11, wherein the biasing member comprises a spring plate disposed between the guide groove and the seatback.

14. A coupling structure according to claim 13, wherein the spring plate covers the whole area of the guide groove.

15. A coupling structure according to claim 13, wherein the spring plate presses the head towards the guide groove while the spring plate contacts with the head.

16. A coupling structure according to claim 13, wherein the spring plate presses the moving pin positioned between the accommodating point and the using point in a direction opposed to seatback.

* * * * *